March 18, 1958         G. O. CONNER         2,827,313
SEALING COMPOUND HOLDING PIPE THREAD
Filed Nov. 1, 1954

INVENTOR.
GUY O. CONNER
BY
J. D. Douglas
HIS ATTORNEY

United States Patent Office 2,827,313
Patented Mar. 18, 1958

2,827,313

SEALING COMPOUND HOLDING PIPE THREAD

Guy O. Conner, Cleveland, Ohio, assignor to Republic Steel Corporation, Cleveland, Ohio, a corporation of New Jersey Application November 1, 1954, Serial No. 465,879

4 Claims. (Cl. 285—289)

This invention relates to improvements in threaded articles and more particularly to an improved thread for use in pipe couplings or on pipes.

Heretofore, considerable difficulty has been realized in conjunction with the assembly of pipes in the making of leakproof joints.

The common practice has been to smear the threads with sealing compound prior to screwing the parts together and hoping that enough of the compound would be carried into the joint to provide a good seal. Frequently, burrs on the threads broke off and were carried in during the assembling operation, cutting grooves in the threads which caused leakage. The main difficulty, however, was in the fact that in the act of assembling the joint the compound was wiped off as the threads were brought together, and the seal was merely a superficial one largely at the chamfer of the threads.

By the present invention I have provided an improved thread wherein the compound is carried well into the joint to effect the sealing operation and where small, loose particles may be automatically collected, rendering them harmless.

In the accompanying drawings.

Throughout the drawings like parts have been designated by like reference characters.

Briefly, my invention comprises the formation of pockets or cavities in the thread, which cavities carry a compound into the joint when the pipe parts are threaded together and thus distributes the compound along the threads.

Figure 1:
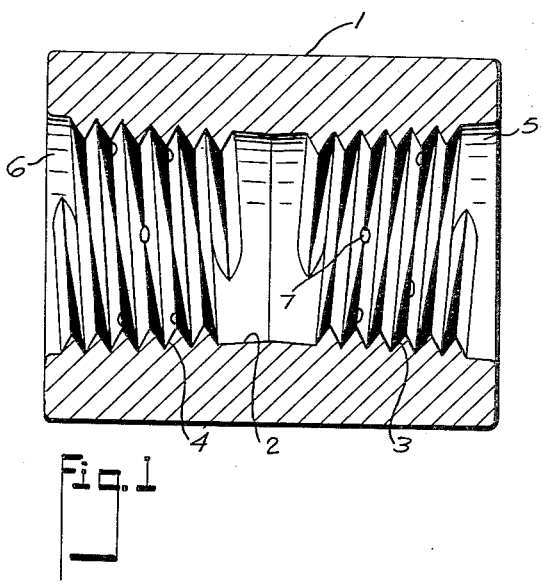
Fig. 1 is a vertical longitudinal section through a pipe coupling illustrating my invention.
Figure 2:
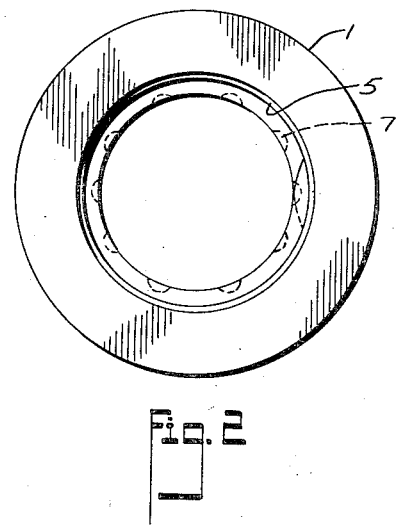
Fig. 2 is an end elevational view thereof.

In Fig. 1, there is shown a pipe coupling having a wall 1 which may be substantially cylindrical, the interior of which is divided with two tapered threaded zones 3 and 4, extending from the ends toward the middle. Chamfers 5 and 6 are formed on the opposite end and a relieved zone 2 is formed in the middle. Preferably, the threads are formed by a forging operation where the coupling is supported in a chuck and an anvil is disposed inside of the coupling, the two being rotated at the same R. P. M. and pressure exerted between the two to cause the metal to flow into the grooves on the anvil. This is more particularly described in my copending application Serial No. 467,463, filed November 8, 1954.

At spaced intervals the threads are provided with pockets 7 which extend from the crest of the thread into the body thereof. These pockets may be distributed throughout the length of the thread at spaced and staggered intervals. The pockets may be formed during the forging operation by providing projections carried by the anvil which may be circular in form. Since the linear speed of the anvil and the work piece are different the actual formation of the pockets, in this case, will be to provide elongated pockets.

Preferably, the opening to the pockets should not extend downward to the root of the threads but should terminate well above the root.

Figure 3:
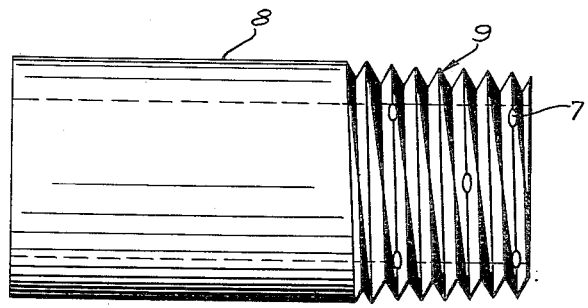
Fig. 3 is an elevational view of the threaded end of the pipe.

In Fig. 3, the same pockets are shown distributed in the same manner applied to the end of a pipe 8 which is threaded at 9. The number and relationship of the pockets may be varied as is deemed expedient.

A pipe and/or a coupling provided with these pockets or cavities has sealing compound applied to the threads in the usual manner. When the mating threads are screwed together, although the sealing compound may largely be wiped off, discreet quantities of the compound are carried into the threads particularly at the crest where the crest and roots meet. Should there be small particles that would tend to break the crest of the thread as has previously frequently occurred, these small particles will be picked up by the pockets and carried along in a harmless manner preventing them from packing between the sides of the thread and thus providing a joint that is not tight. It will be apparent that the pockets could be provided in other manners than that described, but that the process described is a particularly efficient way of attaining this structure.

Figure 4:
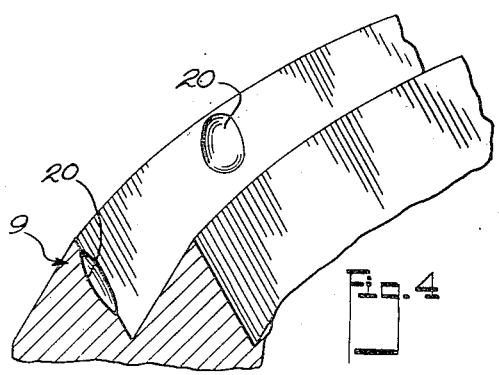
Fig. 4 is a fragmentary perspective view of a portion of a threaded object showing a modified form of pocket therein.

In Fig. 4, I have shown a modification where the pockets were disposed on the side face of the thread. 20 illustrates such a pocket which is a generally concave indentation. These pockets may be disposed along the pitch line. The preferred form, however, contemplates a pocket that starts very close to or at the crest and extends down nearly to the root.

Figure 5:
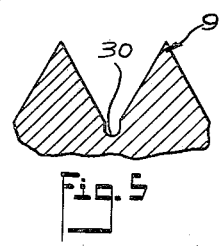
Fig. 5 is a sectional view showing another placement of the pocket.

Fig. 5 illustrates a pocket 30 disposed at the root line. It will be apparent that these pockets can be equally well applied to both internally and externally threaded objects.

As previously stated, the pockets may be in spaced relation to each other and vary in depth. Preferably, the sides of the pockets should merge gradually with the face of the thread which facilitates the manner in which the compound may be distributed by the pockets. Where the pockets are in the crest it is important that these pockets should not be so large that they provide a complete gap in the land extending down to the root.

Having thus described my invention, I am aware that numerous and extensive departures may be made therefrom without departing from the spirit or scope thereof as defined by the appended claims.

I claim:

1. A thread for couplings and pipes having sealing compound carrying pockets spaced along substantially the entire length of the thread, said pockets being generally elliptical in shape and having side walls which merge gradually with the face of the thread.

2. The invention of claim 1 in which said pockets are formed entirely in a face of the thread.

3. The invention of claim 1 in which said pockets are formed in the crest of the thread and in which the major axis of each pocket is disposed in the direction of the crest.

4. The invention of claim 1 in which said pockets are formed in the land between threads and in which the major axis of each pocket is disposed in the direction of the land.

References Cited in the file of this patent

UNITED STATES PATENTS

| 113,557 | Pearson | Apr. 11, 1871 |
|---|---|---|
| 2,177,005 | Purtell | Oct. 24, 1939 |
| 2,177,100 | Frame | Oct. 24, 1939 |
| 2,352,982 | Tomalis | July 4, 1944 |
| 2,741,288 | Johnson | Apr. 10, 1956 |

FOREIGN PATENTS

| 975,103 | France | Oct. 11, 1950 |